(12) United States Patent
Rosagro et al.

(10) Patent No.: US 12,405,061 B2
(45) Date of Patent: Sep. 2, 2025

(54) METHOD FOR COOLING A HEATING APPARATUS

(71) Applicant: Spirax-Sarco Limited, Cheltenham (GB)

(72) Inventors: Joe Rosagro, Cheltenham (GB); Jeremy Miller, Cheltenham (GB); Rafal Chachulski, Cheltenham (GB)

(73) Assignee: Spirax-Sarco Limited, Cheltenham (GB)

( * ) Notice: Subject to any disclaimer, the term of this patent is extended or adjusted under 35 U.S.C. 154(b) by 399 days.

(21) Appl. No.: 17/625,002

(22) PCT Filed: Jun. 30, 2020

(86) PCT No.: PCT/EP2020/068429
§ 371 (c)(1),
(2) Date: Jan. 5, 2022

(87) PCT Pub. No.: WO2021/004840
PCT Pub. Date: Jan. 14, 2021

(65) Prior Publication Data
US 2022/0282922 A1   Sep. 8, 2022

(30) Foreign Application Priority Data
Jul. 5, 2019 (GB) .................................... 1909697

(51) Int. Cl.
*A21B 3/04* (2006.01)
*F24C 15/32* (2006.01)
(Continued)

(52) U.S. Cl.
CPC .............. *F27D 9/00* (2013.01); *F24C 15/327* (2013.01); *F27D 2009/0013* (2013.01); *F27D 2019/0056* (2013.01)

(58) Field of Classification Search
CPC .............. F27D 9/00; F27D 2009/0013; F27D 2009/0056; A21B 3/04
See application file for complete search history.

(56) References Cited

U.S. PATENT DOCUMENTS 4,392,049 A * 7/1983 Bentley ................. B23K 1/015
                                                    392/397
2018/0142900 A1   5/2018 McKee et al.

FOREIGN PATENT DOCUMENTS

CN       1902445 A   1/2007
CN     102369399 A   3/2012
(Continued)

OTHER PUBLICATIONS

Ando, JP2005265341 and translation (Year: 2005).*
(Continued)

*Primary Examiner* — Steven S Anderson, II
(74) *Attorney, Agent, or Firm* — Banner & Witcoff, Ltd.

(57) ABSTRACT

A method of cooling a heating apparatus includes a heating chamber. The method includes accumulating condensate in the heating chamber, monitoring a pressure in the heating chamber, and controlling the pressure in the heating chamber by venting the heating chamber to thereby controllably permit vaporisation of the condensate that cools the heating chamber. The pressure is controlled to maintain a rate of cooling of the heating chamber within a predetermined range. A heating installation is configured to perform the method. A cooling unit may be connected to a heating apparatus to cool the heating apparatus using the method. A method may be used for retrofitting the cooling unit to a heating apparatus to form the heating installation.

19 Claims, 3 Drawing Sheets

(51) Int. Cl.
    *F27D 9/00*           (2006.01)
    *F27D 19/00*        (2006.01)

(56)              References Cited

FOREIGN PATENT DOCUMENTS

| | | | |
|---|---|---|---|
| DE | 3821205 A1 | 12/1989 | |
| EP | 0171522 A1 * | 2/1986 | |
| JP | H02268295 A | 11/1990 | |
| JP | 2005195255 A | 7/2005 | |
| JP | 2005265341 A * | 9/2005 | ............. A21B 3/04 |
| JP | 2009109027 A * | 5/2009 | |
| TW | 201812029 A | 4/2018 | |
| WO | 9609771 A1 | 4/1996 | |

OTHER PUBLICATIONS

Tani, JP2009109027 and translation (Year: 2009).*
Meister, EP0171522 (Year: 1986).*
Mar. 13, 2023—(CN) Official Action—App 202080083814.
Dec. 18, 2019—(GB) Search Report—App. No. GB1909697.3.
Nov. 27, 2020—(WO) International Search Report & Written Opinion—App. No. PCT/EP2020/068429.

* cited by examiner

METHOD FOR COOLING A HEATING APPARATUS

CROSS-REFERENCE TO RELATED APPLICATIONS

This application is a U.S. National Stage Application under 35 U.S.C. § 371 of International Application No. PCT/EP2020/068429, filed Jun. 30, 2020, which claims the benefit of priority to United Kingdom Patent Application No. GB 1909697.3, filed Jul. 5, 2019, and the present application claims priority to and the benefit of the filing date of both of these prior applications, which are incorporated by reference herein in their entireties.

TECHNICAL FIELD

The present invention relates to a method of cooling a heating apparatus, a heating installation configured to perform the method, a cooling unit for connecting to a heating apparatus, for cooling the heating apparatus, and a method of retrofitting a cooling unit to a heating apparatus.

BACKGROUND

A heating apparatus having a heating chamber may be used for industrial cooking. In such a heating apparatus, the heating chamber may be heated and foodstuffs within the heating chamber may be cooked, or walls surrounding the heating chamber may be heated and foodstuffs may be cooked on the heated walls. In such heating operations, the heating apparatus may require cleaning after each heating operation. This requires the heating apparatus to be allowed to cool, so that it can be cleaned, ready for the next heating operation.

BRIEF SUMMARY

According to a first aspect, there is provided a method of cooling a heating apparatus comprising a heating chamber, the method comprising: accumulating condensate in the heating chamber; monitoring a pressure in the heating chamber; controlling the pressure in the heating chamber by venting the heating chamber to thereby controllably permit vaporisation of the condensate that cools the heating chamber; wherein the pressure is controlled to maintain a rate of cooling of the heating chamber within a predetermined range.

Monitoring the pressure in the heating chamber may be done indirectly such as by monitoring pressure downstream of the heating chamber, or monitoring temperature, or force on valve etc.

Vapour may be vented in a first phase until the pressure in the heating chamber is reduced to a threshold pressure. The method may comprise activating a pressure reducer in response to reaching the threshold pressure, to reduce the pressure in the heating chamber below the threshold pressure in a second phase, in order to further control the vaporisation of the condensate.

The threshold pressure may be ambient pressure (i.e. atmospheric pressure). Venting in the first phase may be to ambient air (atmospheric air). The pressure reducer may be a vacuum pump or a thermocompressor, for example.

Monitoring the pressure may comprise manually reviewing a pressure display. Monitoring the pressure may comprise a controller receiving a pressure parameter relating to the pressure in the heating chamber from a sensor.

Accumulating the condensate may comprise receiving vapour from a vapour supply, condensing the vapour in a heat exchanger and supplying the condensate to the heating chamber.

The vapour may be steam from a steam supply. The vapour supply may be a remote steam supply in that it is delivered to the heating apparatus from a steam generator remote from the heating apparatus. The remote vapour generator may supply vapour to a plurality of apparatuses, including like heating apparatuses and/or one or more other apparatuses that use vapour. The vapour supply may be a local vapour supply which is local to the heating apparatus and comprises a vapour generator. The vapour supply may be the same vapour supply which is used for heating the heating apparatus. The vapour supply may be dedicated to the heating apparatus.

The heating apparatus may be coupled to a vapour supply. The method may comprise isolating the vapour supply from the heating chamber before accumulating the condensate.

The heating apparatus may be coupled to a condensate drain via a condensate line for draining condensate from the heating chamber. The method may comprise isolating the heating chamber from the condensate drain before accumulating the condensate.

Supplying the condensate to the heating chamber may comprise pumping the condensate through the condensate line to the heating chamber.

The heating chamber may be vented through a vent valve. The pressure reducer may be a thermocompressor which is activated by opening a motive valve connecting the vapour supply to a motive inlet of the thermocompressor. The heating chamber may be connected to a vapour inlet of the thermocompressor via the vent valve.

The heating apparatus may be rotated while cooling.

A predetermined amount of condensate may be accumulated in the heating chamber before venting of the heating chamber, wherein no further condensate is accumulated after the venting begins until cooling operation is completed. Alternatively, the condensate may be accumulated in the heating chamber simultaneously or alternately with venting of the heating chamber.

The pressure of the heating chamber may be automatically monitored by a controller. The venting of the heating chamber may be automatically controlled with the controller based on the monitored pressure, so that cooling of the heating apparatus follows a predetermined cooling profile.

The method may comprise monitoring a rate of cooling, and controlling the pressure based on the monitored rate of cooling, such that the cooling rate stays within a predetermined range. The rate of cooling may be the rate of cooling of the vapour, the rate of cooling of the condensate and/or the rate of cooling of the heating apparatus, such as a wall of the heating chamber.

The method may comprise using the same vapour supply as was used in a previous heating operation to heat the heating apparatus.

According to a second aspect, there is provided a heating installation configured to perform the method in accordance with the first aspect, the heating installation comprising: a heating chamber; a condensate supply configured to supply condensate to the heating chamber and a condensate line fluidically connecting the heating chamber with the condensate supply; a vent valve, and a venting line connecting the heating chamber to the vent valve, which are configured to permit venting of the heating chamber; and a pressure sensor configured to generate a pressure parameter relating to the pressure in the heating chamber.

The heating installation may further comprise a pressure reducer configured to reduce pressure in the heating chamber below a threshold pressure when activated. The pressure reducer may be a thermocompressor activatable by opening a motive valve to thereby connect the vapour supply to a motive inlet of the thermocompressor. The heating chamber may be connected to a vapour inlet of the thermocompressor via the vent valve.

The condensate supply may comprise a vapour supply and a heat exchanger configured to condense vapour from the vapour supply to produce condensate.

The heating installation may comprise a vapour line connecting the vapour supply with the heating chamber for supplying vapour to heat the heating chamber in a heating operation. The vapour line may comprise a supply valve configured to isolate the vapour supply from the heating chamber.

The heating installation may comprise a condensate drain coupled to the heating chamber via the condensate line for draining condensate from the heating chamber in the heating operation. The condensate line may comprise a condensate valve configured to isolate the condensate drain from the heating chamber.

The heating installation may comprise a controller configured to perform the method in accordance with the first aspect.

According to a third aspect, there is provided a cooling unit for connecting to a heating apparatus having a heating chamber, for cooling the heating apparatus using a method in accordance with the first aspect, the cooling unit comprising: a venting line configured to be connected to the heating chamber, the venting line having a vent valve for permitting venting of the heating chamber; a condensate line configured to be connected to the heating chamber and having a condenser configured to supply condensate to the heating chamber via the condensate line.

The cooling unit may comprise a pressure reducer connected to the vent valve via the venting line and configured to reduce the pressure in the heating chamber.

The cooling unit may comprise a vapour generator for supplying vapour to the inlet of the condenser, which is configured to condense the vapour to supply condensate.

The cooling unit may be configured to be connectable to and detachable from a vapour supply which is configured to supply vapour to the heating apparatus, so as to supply vapour to the condenser for supplying condensate when connected.

The condensate line may comprise a condensate drain (steam trap) between an outlet of the condenser and the heating chamber.

The condensate line of the cooling unit may be configured to be connectable to a condensate line of the heating apparatus.

The pressure reducer may comprise a thermocompressor having a motive inlet which is connected to a vapour line. The vapour line may have a motive valve and may be connectable to the vapour supply for supplying motive vapour to the thermocompressor.

A sensor may be configured to generate a pressure parameter relating to the pressure in the heating chamber. The heating apparatus may have a sensor which is capable of generating a pressure parameter relating to pressure within the heating chamber, and the cooling unit may be configured to receive the pressure parameter from the sensor in the heating apparatus.

The cooling unit may comprise a controller configured to monitor the pressure in the heating chamber. The controller may be configured to automatically control opening of the vent valve so that the cooling of the heating apparatus follows a predetermined cooling profile.

The controller may be configured to monitor the pressure in the heating chamber and to automatically control activation of the pressure reducer so that the cooling of the heating apparatus follows a predetermined cooling profile. The controller may be configured to receive a pressure parameter from a sensor in the cooling unit, or the controller may be configured to receive a pressure parameter from a sensor in the heating apparatus to monitor the pressure.

Alternatively, the pressure may be monitored manually by a display showing the pressure, and the opening of the vent valve and activation of the pressure reducer may be performed manually.

According to a fourth aspect, there is provided a method of retrofitting a cooling unit in accordance with the third aspect to a heating apparatus to provide a heating installation in accordance with the second aspect, the method comprising connecting the condensate line of the cooling unit and the venting line of the cooling unit with the heating chamber of the heating apparatus.

DESCRIPTION OF THE DRAWINGS

Embodiments of the invention will now be described, by way of example only, with reference to the accompanying drawings, in which.

DETAILED DESCRIPTION

Figure 1:
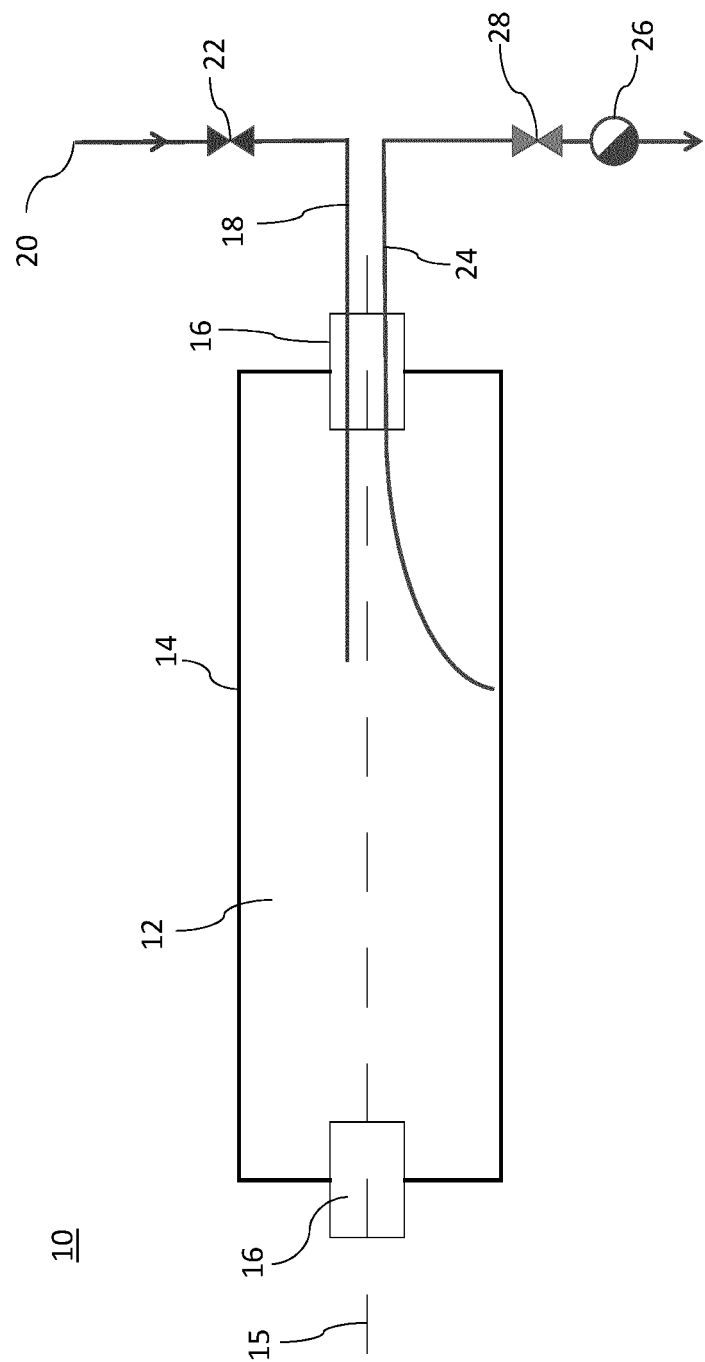
FIG. 1 schematically shows a cross sectional view of a heating apparatus.

FIG. 1 shows a cross sectional view of a heating apparatus 10 comprising a heating chamber 14 in the form of a drum and defining an enclosed cavity 12. In this example, an external wall of the drum 14 is cylindrical and extends along a longitudinal axis 15. In other examples, the external wall of the heating chamber may define any shape.

The drum 14 is mounted on a pair of mounts 16 at respective longitudinal ends of the drum 14. The drum 14 is rotatably mounted on the mounts 16 such that the drum can be rotated about the longitudinal axis 15 with respect to the mounts 16. In other examples, the drum may be fixedly mounted to the mounts or any suitable support structure.

A vapour line 18 extends from outside the drum 14 through a first mount 16 and into the drum 14, and thereby fluidically connects the enclosed cavity 12 with a vapour supply 20. In this example, the vapour supply 20 is a steam supply. In other examples, the vapour supply may supply any suitable vapour, such as a refrigerant.

The vapour line 18 comprises a supply valve 22 configured to isolate the heating chamber 12 from the steam supply 20 when in a closed position, and to permit flow of steam from the steam supply 20 to the heating chamber 12 when in an open position.

A condensate line 24 extends from inside the drum 14 through the first mount 16 and fluidically connects the enclosed cavity 12 with a condensate drain 26. In this example, the condensate drain 26 is a steam trap which is configured to allow condensate to drain through to a condensate sink or to be recirculated in a feedwater or condensate collection system, but prevents through-flow of steam. An end of the condensate line 24 within the drum 14 extends downwards towards the bottom of the heating chamber 12 in the manner of a dip tube, so that it can remove condensate from the bottom of the heating chamber 12. The condensate line 24 comprises a condensate valve 28 between the heating chamber 12 and the condensate drain 26. The condensate valve 28 is configured to isolate the enclosed cavity 12 from the condensate drain 26 when in the closed position, and to permit the flow of condensate from the enclosed cavity 12 to the condensate drain 26 when in the open position.

In use, the heating apparatus 10 is heated in a heating operation, typically to cook foodstuffs. In an example heating operation, the supply valve 22 is opened to permit flow of steam from the steam supply 20 into the heating chamber 14, and the condensate valve 28 is opened to permit the removal of condensate from within the heating chamber 14. The steam within the heating chamber imparts heat to the heating chamber 14 (i.e. to the wall of the heating chamber), and therefore condenses. The condensate collects at the bottom of the heating chamber 12 and is removed through the condensate drain 26 via the condensate line 24.

The wall of the drum 14 is therefore heated so that it can be used to cook foodstuffs on an external surface of the drum 14. For example, the wall of the drum 14 may be heated to approximately 200° C. (degrees Celsius). In this example, at the end of the heating operation, the drum 14 is cooled to approximately 50° C. (degrees Celsius) for cleaning, so that it is ready for a subsequent heating operation.

Although it has been described that the heating apparatus comprises a vapour supply for heating the heating chamber, and a condensate drain, in other examples the heating apparatus may comprise a heating chamber such as a drum which may be heated by any other means, such that the heating apparatus does not include a vapour line to a vapour supply and a condensate line to a condensate drain. For example, suitable heating means may be conductive heating elements (e.g. electric heaters), gas burners or embedded circuits for circulating a heating fluid within the walls of the chamber (rather than its cavity).

Figure 2:
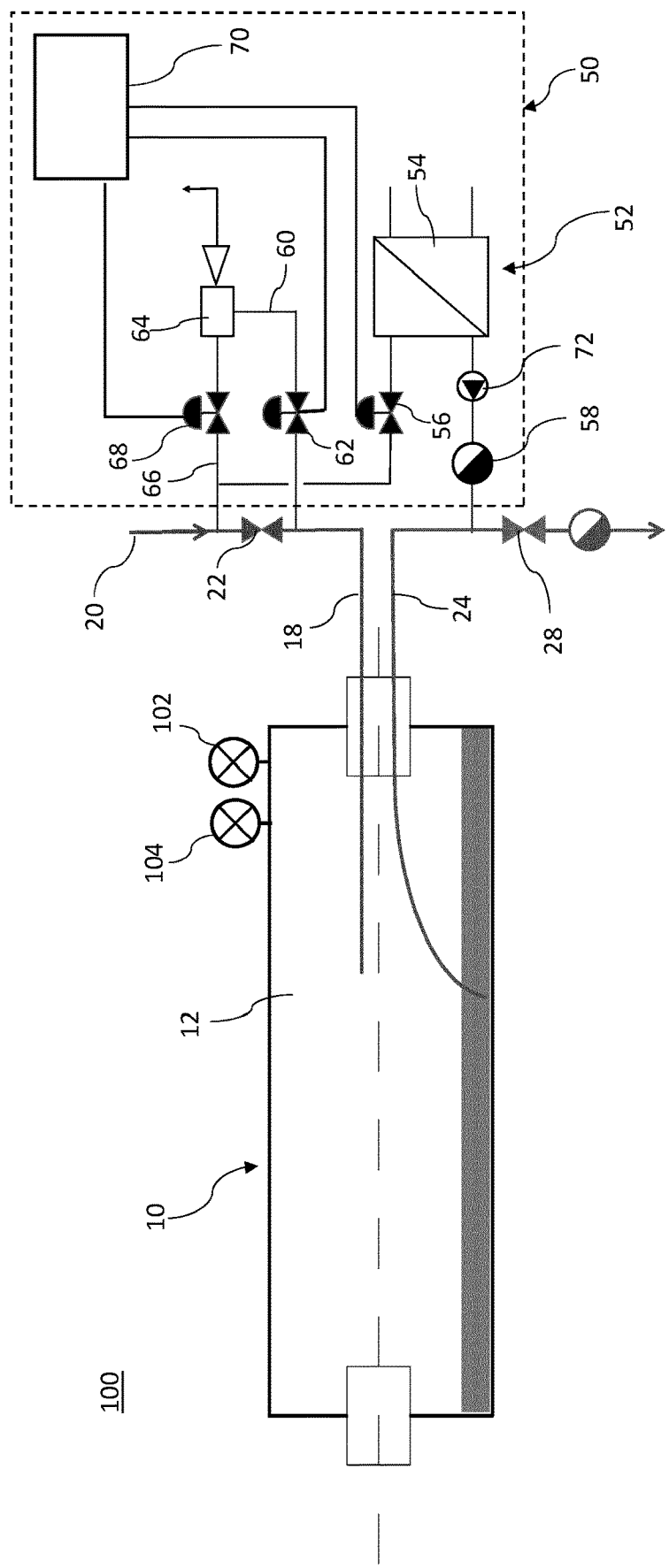
FIG. 2 schematically shows a cross-sectional view of a heating installation comprising the heating apparatus of FIG. 1 and a cooling unit.

FIG. 2 shows a heating installation 100 comprising the heating apparatus 10 described above with respect to FIG. 1 connected with a cooling unit 50. In this example, the cooling unit 50 is retrofittable to the heating apparatus 10 (i.e. detachable from and attachable to the heating apparatus 10) to form the heating installation 100. In this example, the heating apparatus 10 is provided with a pressure sensor 102 which is connected to the heating chamber 12 and which is configured to generate a pressure parameter relating to the pressure in the heating chamber 12. In some examples, the sensor may be any sensor which is configured to generate a pressure parameter relating to the pressure in the heating chamber such as a temperature sensor or a force sensor on a valve connected downstream of the heating chamber. As will be appreciated pressure is a function of temperature when a fluid is at saturation, and force across an orifice of a suitably configured valve may be a function of pressure.

The heating apparatus 10 is provided with a temperature sensor 104 which is connected to the heating chamber 12 and which is configured to generate a temperature parameter related to the temperature of the heating chamber 12 or its cavity. In some examples, the sensor may be any sensor which is configured to generate a temperature parameter relating to the temperature of the heating chamber, such as a strain sensor on a wall of the heating chamber, or a pressure sensor.

In some examples, the pressure sensor and temperature sensor are part of the cooling unit and are coupled to the heating chamber 14 upon installation of the cooling unit 50.

The cooling unit 50 comprises a condensate supply 52 in the form a heat exchanger 54 having an inlet fluidically connected with the steam supply 20 via a vapour supply valve 56, and configured to condense the steam to provide condensate. An outlet of the heat exchanger 54 is connected to the condensate line 24 between the condensate valve 28 and the heating chamber 12, via a steam trap 58. The steam trap 58 permits through-flow of condensate from the heat exchanger 54 to the heating chamber 12, and prevents through-flow of any steam from the heat exchanger 54 to the heating chamber 12. In this example, the condensate supply 52 also comprises a pump 72 which is configured to pump the condensate from the heat exchanger 54 through the steam trap, and into the heating chamber 12.

In some examples, the condensate supply may be coupled to a vapour supply of any vapour, which is condensed in the heat exchanger. In other examples, the condensate supply may comprise a liquid supply (i.e. without local condensation), such as a water supply, such that a heat exchanger and steam trap are not be needed. However, if the condensate supply is a liquid water supply, the heating installation may require a blowdown apparatus in order to remove impurities that may otherwise build up in the heating chamber.

Condensing vapour from a vapour supply 20 to supply condensate ensures that the condensate is clean (i.e. does not contain impurities), so that no blowdown apparatus is required to remove impurities. Further, as heating apparatuses typically use a vapour supply in a heating operation, such a cooling unit may be easily assembled with a heating apparatus by providing the separate cooling unit with a heat exchanger and connecting it to use the same vapour supply as the heating apparatus. Therefore, no separate condensate or liquid supply would be required.

The cooling unit 50 further comprises a venting line 60 which is connected to the vapour line 18 between the supply valve 22 and the heating chamber 12, so that it is fluidically connected to the cavity of the heating chamber 12. The venting line 60 comprises a vent valve 62 which is configured to permit venting of the heating chamber 12 to atmosphere when the vent valve 62 is in an open position.

The venting line 60 is vented to atmosphere through a pressure reducer 64. In this example, the pressure reducer 64 is a thermocompressor, with the venting line 60 is connected to a vapour inlet of the thermocompressor 64. A motive line 66 fluidically connects the steam supply 20 with a motive inlet of the thermocompressor 64. The motive line 66 comprises a motive valve 68 which is configured to permit through-flow of motive steam from the steam supply 20 to the motive inlet of the thermocompressor 64 when the motive valve 68 is in an open position.

The thermocompressor 64 is thereby configured to pump vapour from the heating chamber 14 to atmosphere when both the vent valve 62 and the motive valve 68 are in open positions, and to allow venting of steam (or any vapour) from the heating chamber 14 to atmosphere when the vent valve 62 is open, and the motive valve 68 is closed. The term venting as used herein is intended to mean passively permitting a pressurised vapour to exit the chamber under its own motive force, whereas pumping is intended to mean actively driving a vapour from the heating chamber, for example by using a pressure reducer such as the thermocompressor. In some examples, the pressure reducer may be any device capable of reducing a downstream pressure to draw vapour from the heating chamber, such as a vacuum pump. In other examples, there may be no pressure reducer, such that the vent valve merely permits venting of the heating chamber to ambient air.

The cooling unit 50 also comprises a controller 70 which is configured to receive the pressure parameter and temperature parameter from the pressure sensor 102 and temperature sensor 104 respectively. The controller 70 is configured to control the opening and closing of the condensate supply valve 56, the vent valve 62 and the motive valve 68 based on the received temperature and pressure parameters to keep a cooling rate of the heating chamber 14 within an acceptable limit, as will be explained in more detail below.

In this example, the cooling unit 50 is provided on a skid or pallet, such that it can be easily retrofitted as a module to the heating apparatus, and equally easily removed from the heating apparatus 10. Providing the cooling unit 50 on a skid or pallet also allows the cooling unit 50 to be easily moved between different heating apparatuses, so that it can be retrofitted to a heating apparatus, removed from that heating apparatus after the cooling operation has been performed, and moved to a different heating apparatus.

In this example, as explained above, the supply valve 22 and the condensate valve 28 are open during the heating operation. At the end of the heating operation, a cooling operation may be commenced which will be described below.

Figures 3, 4:
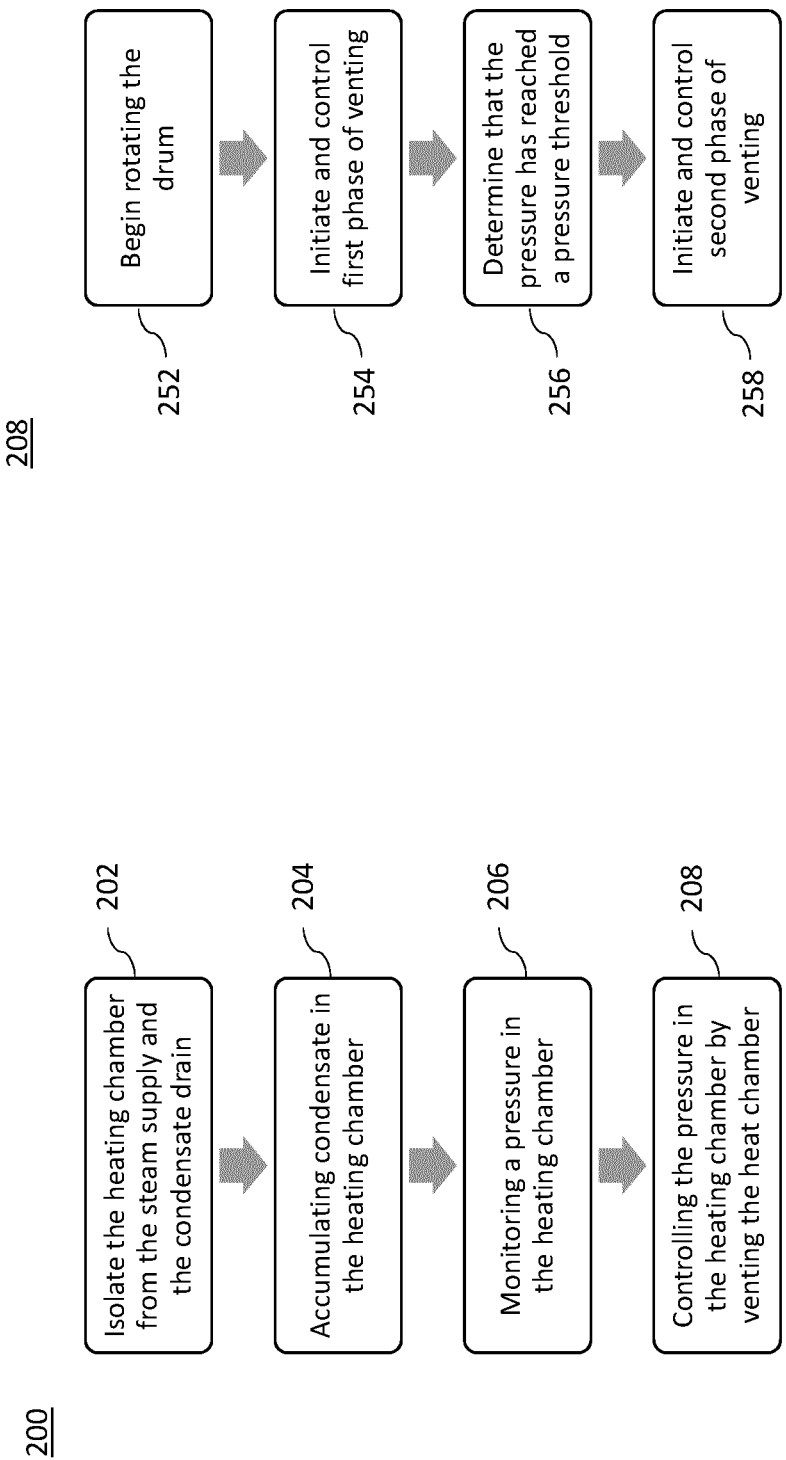
FIG. 3 is a flow chart of a method of cooling the heating installation.
FIG. 4 is a flow chart of a method of controlling venting of a heating chamber.

FIG. 3 is a flow chart 200 showing steps of a cooling operation in which a heating chamber 14 as described above is cooled in a heating installation 100. The cooling operation is initiated after a heating operation in which the heating chamber 14 has been heated.

In block 202, the heating chamber 14 is isolated from the steam supply 20 and from the condensate drain 26. The heating chamber 14 is isolated from the steam supply 20 by closing the supply valve 22, and the heating chamber 14 is isolated from the condensate drain 26 by closing the condensate valve 28. In other examples where the heating apparatus does not comprise a vapour supply and is heated by other means, this step is not performed. In other examples where the heating apparatus alternatively or additionally does not include a condensate drain, this step of the method may not include isolating the heating chamber from the condensate drain.

In block 204, condensate is accumulated in the heating chamber 14 from the condensate supply 52. Condensate is accumulated by opening the condensate supply valve 56 such that steam from the steam supply 20 is permitted to flow through the heat exchanger 54. The steam is condensed to condensate in the heat exchanger 54, and the condensate is permitted to flow through the steam trap 58, into the heating chamber 12. In other examples where the cooling unit does not include a heat exchanger, a corresponding step may instead include opening a condensate supply valve to allow flow of condensate from any condensate supply, or may include activating a pump to pump condensate into the heating chamber. When a predetermined amount of condensate has been accumulated in the heating chamber 14, the controller 70 closes the condensate supply valve 56. The predetermined amount of condensate may be calculated specifically to cool the chamber be a predetermined amount. In this example no more condensate from the condensate supply 52 is permitted to accumulate in the heating chamber 12 during the cooling operation.

In some examples, there is no controller such that the opening and closing of the condensate supply valve 56 may be controlled and performed manually. The amount of condensate accumulated may be determined with a flow sensor, or any other suitable sensor.

In block 206, the pressure in the heating chamber 12 is monitored by the controller 70. A pressure parameter from a pressure sensor 102 and a temperature parameter from a temperature sensor 104 are received by the controller 70 and the controller 70 monitors the pressure and temperature based on the received parameters. The pressure and temperature monitoring also occurs continuously during block 208. In some examples, the pressure and temperature may be displayed to a user, and may thereby be monitored by a user instead of or as well as by a controller.

In block 208, the controller 70 controls the pressure in the heating chamber and thereby the cooling of the heating chamber 14 by controlling venting of the heating chamber 12. In some examples, the venting of the heating chamber may be manually controlled by a user based on displayed pressure and temperature parameters from the pressure and temperature sensors.

FIG. 4 shows an example sub-method 208 of controlling venting of the heating chamber 14. During the sub-method 208, the pressure and temperature in the heating chamber 14 is continuously monitored by the controller 70.

In block 252, the heating chamber 14 is driven to rotate about the longitudinal axis 15. The heating chamber 14 is rotated throughout the sub-method 208 to even out the cooling of the heating chamber 14 across the whole surface of the drum 14 during cooling. For example, a rate of heat transfer may be higher where condensate is in contact with a wall of the chamber 14 than where vapour is in contact with the wall of the chamber 14. In other examples, the heating chamber 14 may remain stationary during the cooling operation, or may begin rotating earlier in the cooling operation (for example during or before accumulation of condensate).

In block 254 of the sub-method 208, the controller 70 initiates and controls a first phase of venting, in which the vent valve 62 is opened to permit venting of the heating chamber 14 to atmosphere. When the pressure in the heating chamber is above atmospheric pressure, opening of the vent valve 62 results in a pressure drop in the heating chamber 12 such that the saturation temperature reduces and the condensate vapourises. The applicant has found that this promotes heat transfer from the walls of the heating chamber 14 to the fluid received therein, both owing to a temperature differential between the wall and the fluid as the saturation temperature reduces, and owing to heat transfer corresponding to the latent heat of vaporisation of the condensate as it vaporises. The vaporised condensate (steam) is vented through the vent valve 62. By controlling the rate of reduction in pressure in the heating chamber 14 the method enables more controlled and faster heat transfer from the heating chamber 14 than is possible by passive cooling. In an example, the applicant has found that a cooling time of a heating chamber may be reduced from 8 hours to 2 hours.

The controller 70 monitors the pressure in the heating chamber 14 and the temperature of the heating chamber 14 during the first phase of venting, and controls the opening and closing of the vent valve 62 to control the reduction in pressure in the heating chamber 14 to thereby maintain a rate of cooling of the heating chamber 14 within a predetermined range and/or to control the cooling of the heating apparatus to follow a predetermined cooling profile.

In block 256, the controller 70 determines whether the pressure within the heating chamber has reached a pressure threshold corresponding to initiating pumping. In this example, the pressure threshold is atmospheric pressure (approximately 101 kPa at sea level), as the vapour is being vented to atmospheric conditions. When the pressure within the heating chamber 14 reaches the pressure threshold (i.e. 101 kPa in this example), passive venting would stop such that vaporisation of condensate in the heating chamber 14 also stops. Therefore, further cooling of the condensate and vapour within the heating chamber below saturation temperature (100° C. at atmospheric conditions) would only be via heat transfer from the exterior of the drum.

In the example method, when it is determined that the pressure in the heating chamber 14 has reached the pressure threshold, the controller 70 moves on to block 258 to cause further reduction of pressure.

In block 258, the controller 70 initiates a second phase of venting. In the second phase of venting, the controller 70 activates the pressure reducer 64, which in this example involves opening the motive valve 68 to activate the thermocompressor 64. When the vent valve 62 is opened, the thermocompressor 64 pumps the steam out of the heating chamber 14, thereby reducing the pressure in the heating chamber 12 to below the pressure threshold. This causes further reduction of the saturation temperature and further vaporisation of the condensate, thereby further cooling the heating chamber 14. The controller 70 continues to monitor the pressure and temperature and to control opening and closing of the vent valve 62 while the motive valve 68 is open, so as to maintain the rate of cooling of the heating chamber 14 to within the predetermined range until the temperature of the heating chamber 12 and/or drum 14 reaches the desired cooled temperature, which in this example is approximately 50° C. This is the end of the cooling operation, such that the heating chamber may be cleaned, and the heating operation and cooling operation may be repeated.

An example predetermined range for a rate of cooling of the heating chamber may be between 0.5-10° C. per minute, such as 0.5-5° C. per minute, or 0.5-3° C. per minute or 0.5-1.5° C. per minute. Different rates of cooling may be suitable for different chambers and materials.

As described above, in some examples, there may be no pressure reducer in the cooling unit, such that there is no second phase of venting as described above. In such examples, cooling is controlled in a first phase of venting only.

In this example, the amount of condensate accumulated in the heating chamber 12 at the beginning of the method 200 may be calculated such that it is substantially all vaporised at the point when the temperature of the heating chamber reaches the desired cooled temperature.

Although it has been described that a predetermined amount of condensate is accumulated in the heating chamber before venting is initiated in the second step 204 of the method 200, and that no further condensate is permitted to accumulate in the heating chamber, in other examples, the accumulation of condensate in the heating chamber may occur simultaneously or alternately with venting of the heating chamber. In such examples, the time taken to cool the heating chamber to the desired cooled temperature may be further reduced because the cooling of the heating chamber by venting may be initiated immediately on initiation of the cooling operation, rather than waiting for the predetermined amount of condensate to be accumulated, and only then initiating the cooling by permitting venting of the heating chamber.

Although it has been described that a one heating chamber receives vapour from a vapour supply, in some examples, there may be multiple heating chambers which receive vapour from a common vapour supply.

Although it has been described that a controller receives the pressure parameter and the temperature parameter and controls the opening and closing of the condensate supply valve, vent valve, and motive valve, in other examples, there may be no controller for one or more of these operations. In such examples, the pressure parameter and temperature parameter may be displayed to a user, and the user may control the opening and closing of the valves using the method as described.

Whilst an example cooling operation has been described in which venting is controlled to maintain a rate of cooling of the heating chamber within a predetermined range, it should be appreciated that this may be achieved either by monitoring a parameter relating to the temperature of the heating chamber and controlling the venting in response, or by causing the venting to occur in a predetermined way that is known to correspond to a cooling of the heating chamber at a rate within the predetermined range. This may be determined empirically, for example during commissioning of a heating installation, or by simulation.

In other examples, the heating chamber may take any suitable form, and may be configured to heat an article on the outside of the heating chamber, or to heat articles on the interior of the heating chamber. In some examples, articles for heating may be received in the cavity of the heating chamber (e.g. a steam oven). In other examples, the heating chamber may be in the form of a jacket having an internal and external wall with the cavity defined therebetween, and an article for heating disposed on the opposite side of the internal wall from the cavity (i.e. internally within a separate nested cavity).

The invention claimed is:

1. A method of heating and cooling a heating apparatus comprising a heating chamber, the method comprising:
    accumulating condensate in the heating chamber, wherein accumulating the condensate in the heating chamber comprises receiving vapour from a vapour supply into the heating apparatus to heat the heating chamber and condensing the vapour in the heating chamber;
    monitoring a pressure in the heating chamber;
    controlling the pressure in the heating chamber by venting the heating chamber to thereby controllably permit vaporisation of the condensate that cools the heating chamber; and
    draining condensate from the heating chamber via a condensate line;
    wherein the pressure is controlled to maintain a rate of cooling of the heating chamber within a predetermined range.

2. A method according to claim 1, wherein vapour is vented in a first phase until the pressure in the heating chamber is reduced to a threshold pressure; and wherein the method comprises activating a pressure reducer in response to reaching the threshold pressure, to reduce the pressure in the heating chamber below the threshold pressure in a second phase, in order to further control the vaporisation of the condensate.

3. A method according to claim 1, wherein the heating apparatus is coupled to a vapour supply, and wherein the method comprises isolating the vapour supply from the heating chamber before accumulating the condensate.

4. A method according to claim 1, wherein the heating apparatus is coupled to a condensate drain via the condensate line, and wherein the method comprises isolating the heating chamber from the condensate drain before accumulating the condensate.

5. A method of cooling a heating apparatus comprising a heating chamber, the method comprising:
   accumulating condensate in the heating chamber;
   monitoring a pressure in the heating chamber;
   controlling the pressure in the heating chamber by venting the heating chamber in a first phase to thereby controllably permit vaporisation of the condensate that cools the heating chamber; and
   activating a pressure reducer in response to reaching a threshold pressure, to reduce the pressure in the heating chamber below the threshold pressure in a second phase, in order to further control the vaporisation of the condensate;
   wherein the pressure is controlled to maintain a rate of cooling of the heating chamber within a predetermined range,
   wherein the heating chamber is vented through a vent valve, and wherein the pressure reducer is a thermocompressor which is activated by opening a motive valve connecting a vapour supply to a motive inlet of the thermocompressor, and wherein the heating chamber is connected to a vapour inlet of the thermocompressor via the vent valve.

6. A method according to claim 1, wherein a predetermined amount of condensate is accumulated in the heating chamber before venting of the heating chamber, and wherein no further condensate is accumulated after the venting begins until cooling operation is completed.

7. A method according to claim 1, wherein the pressure of the heating chamber is automatically monitored by a controller, and the venting of the heating chamber is automatically controlled with the controller based on the monitored pressure, so that cooling of the heating apparatus follows a predetermined cooling profile.

8. A method according to claim 1, comprising monitoring a rate of cooling, and controlling the pressure based on the monitored rate of cooling, such that the rate of cooling stays within a predetermined range.

9. A heating installation configured to perform the method in accordance with claim 1, the heating installation comprising:
   a heating chamber;
   a vapour supply configured to supply vapour to the heating chamber to heat the heating chamber and condense in the heating chamber and to form a condensate;
   a vent valve, and a venting line connecting the heating chamber to the vent valve, which are configured to permit venting of the heating chamber to evaporate the condensate;
   a pressure sensor configured to generate a pressure parameter relating to the pressure in the heating chamber;
   a condensate drain coupled to the heating chamber via a condensate line for draining condensate from the heating chamber in a heating operation, and wherein the condensate line comprises a condensate valve configured to isolate the condensate drain from the heating chamber; and
   a controller configured to control the heating installation to perform:
      accumulating condensate in the heating chamber;
      monitoring the pressure in the heating chamber;
      controlling the pressure in the heating chamber by venting the heating chamber via the vent valve and the venting line, to thereby controllably permit vaporisation of the condensate that cools the heating chamber; and
      draining condensate from the heating chamber via the condensate line,
   wherein the pressure is controlled to maintain a rate of cooling of the heating chamber within a predetermined range, and
   wherein accumulating condensate in the heating chamber comprises receiving the vapour from the vapour supply into the heating apparatus to heat the heating chamber and condensing the vapour in the heating chamber.

10. A heating installation according to claim 9, further comprising a pressure reducer configured to reduce pressure in the heating chamber below a threshold pressure when activated.

11. A heating installation according to claim 9, further comprising a condensate supply comprising the vapour supply and a heat exchanger configured to condense the vapour from the vapour supply to produce the condensate.

12. A heating installation according to claim 11, comprising a vapour line connecting the vapour supply with the heating chamber for supplying the vapour to heat the heating chamber in a heating operation, and wherein the vapour line comprises a supply valve configured to isolate the vapour supply from the heating chamber.

13. A cooling unit for connecting to a heating apparatus having a heating chamber, for cooling the heating apparatus using a method in accordance with claim 1, the cooling unit comprising:
   a venting line configured to be connected to the heating chamber, the venting line having a vent valve for permitting venting of the heating chamber;
   a condensate line configured to be connected to the heating chamber and having a condenser configured to supply condensate to the heating chamber via the condensate line, and
   wherein the condensate line comprises a condensate drain between an outlet of the condenser and the heating chamber.

14. A cooling unit according to claim 13, comprising a pressure reducer connected to the vent valve via the venting line and configured to reduce a pressure in the heating chamber, and optionally wherein the pressure reducer comprises a thermocompressor having a motive inlet which is connected to a vapour line, the vapour line having a motive valve and being connectable to a vapour supply for supplying motive vapour to the thermocompressor.

15. A cooling unit according to claim 13, comprising a vapour generator for supplying vapour to an inlet of the condenser, which is configured to condense the vapour to supply condensate.

16. A cooling unit according to claim 13, wherein the cooling unit is configured to be connectable to and detachable from a vapour supply which is configured to supply vapour to the heating apparatus, so as to supply vapour to the condenser for supplying condensate when connected.

17. A cooling unit according to claim 13, wherein the condensate line of the cooling unit is configured to be connectable to a condensate line of the heating apparatus.

18. A cooling unit according to claim 13, comprising a sensor configured to generate a pressure parameter relating to a pressure in the heating chamber, and/or comprising a controller configured to monitor the pressure in the heating chamber and to automatically control opening of the vent valve so that the cooling of the heating apparatus follows a predetermined cooling profile and/or activation of the pressure reducer so that the cooling of the heating apparatus follows a predetermined cooling profile.

19. A method of heating and cooling a heating apparatus comprising a heating chamber, the method comprising:
    accumulating condensate in the heating chamber;
    monitoring a pressure in the heating chamber;
    controlling the pressure in the heating chamber by venting the heating chamber to thereby controllably permit vaporisation of the condensate that cools the heating chamber; and
    draining condensate from the heating chamber via a condensate line;
    wherein the pressure is controlled to maintain a rate of cooling of the heating chamber within a predetermined range;
    wherein accumulating the condensate comprises receiving vapour from a vapour supply, condensing the vapour in a heat exchanger and supplying the condensate to the heating chamber; and
    wherein the vapour supply is the same vapour supply as is used in a previous heating operation to heat the heating apparatus.

* * * * *